United States Patent
Miya et al.

(10) Patent No.: US 7,702,238 B2
(45) Date of Patent: Apr. 20, 2010

(54) LIGHT SHIELDING STRUCTURE IN OPTICAL APPARATUS

(75) Inventors: Kota Miya, Saitama (JP); Yusuke Mizuhara, Tokyo (JP)

(73) Assignee: Hoya Corporation, Tokyo (JP)

( * ) Notice: Subject to any disclaimer, the term of this patent is extended or adjusted under 35 U.S.C. 154(b) by 246 days.

(21) Appl. No.: 11/748,013

(22) Filed: May 14, 2007

(65) Prior Publication Data
US 2007/0269204 A1 Nov. 22, 2007

(30) Foreign Application Priority Data
May 17, 2006 (JP) ............................ 2006-138154

(51) Int. Cl.
*G03B 17/04* (2006.01)
(52) U.S. Cl. ...................................... 396/535; 359/612
(58) Field of Classification Search ................. 396/535; 359/612
See application file for complete search history.

(56) References Cited

U.S. PATENT DOCUMENTS

| | | | |
|---|---|---|---|
| 5,819,118 A * | 10/1998 | Kawasaki et al. | 396/29 |
| 6,024,457 A * | 2/2000 | Kawai et al. | 359/611 |
| 2001/0009611 A1 * | 7/2001 | Akami et al. | 396/29 |
| 2003/0174412 A1 * | 9/2003 | Noguchi | 359/694 |
| 2004/0070849 A1 | 4/2004 | Tanaka | |
| 2004/0150891 A1 * | 8/2004 | Ichino | 359/704 |
| 2004/0156181 A1 | 8/2004 | Nomura et al. | |
| 2006/0034595 A1 * | 2/2006 | Yamazaki et al. | 396/72 |
| 2007/0127910 A1 | 6/2007 | Miya | |

FOREIGN PATENT DOCUMENTS

JP 11 305098 11/1999

OTHER PUBLICATIONS

English language Abstract of JP 11-305098.

* cited by examiner

*Primary Examiner*—Rodney E Fuller
*Assistant Examiner*—Fang-Chi Chang
(74) *Attorney, Agent, or Firm*—Greenblum & Bernstein P.L.C.

(57) ABSTRACT

A light shielding structure in an optical apparatus includes first and second relatively-movable members, each having an engaging portion engaged with each other and relatively movable to each other so as to change an amount of mutually overlapping area therebetween; and a light shielding member provided between the engaging portions. The light shielding member is elastically deformed into a light shielding shape in which the light shielding member inwardly bends toward an optical axis of the optical apparatus to protrude from the engaging portions due to the mutually overlapping area between the engaging portions decreasing, and the light shielding member is elastically deformed into a retracted shape in which the light shielding member is housed between opposing surfaces of the engaging portions due to the mutually overlapping area between the engaging portions increasing, in accordance with a relative movement between the engaging portions.

14 Claims, 7 Drawing Sheets

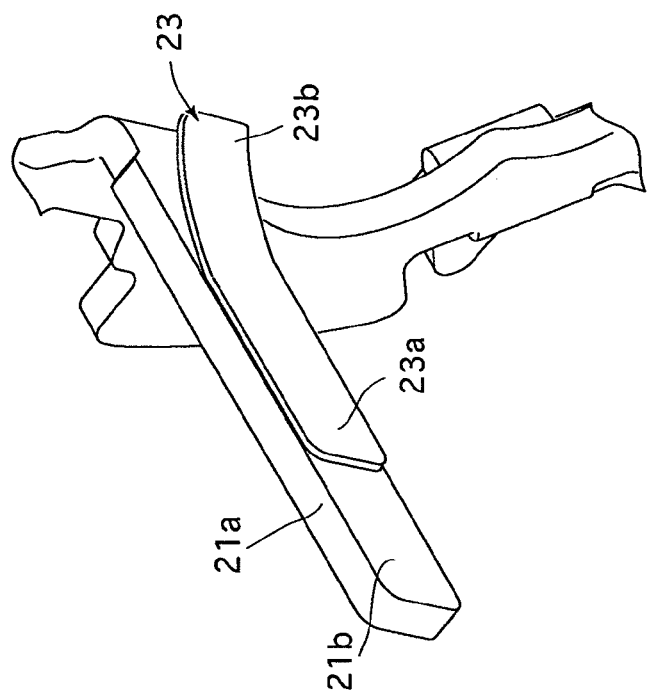
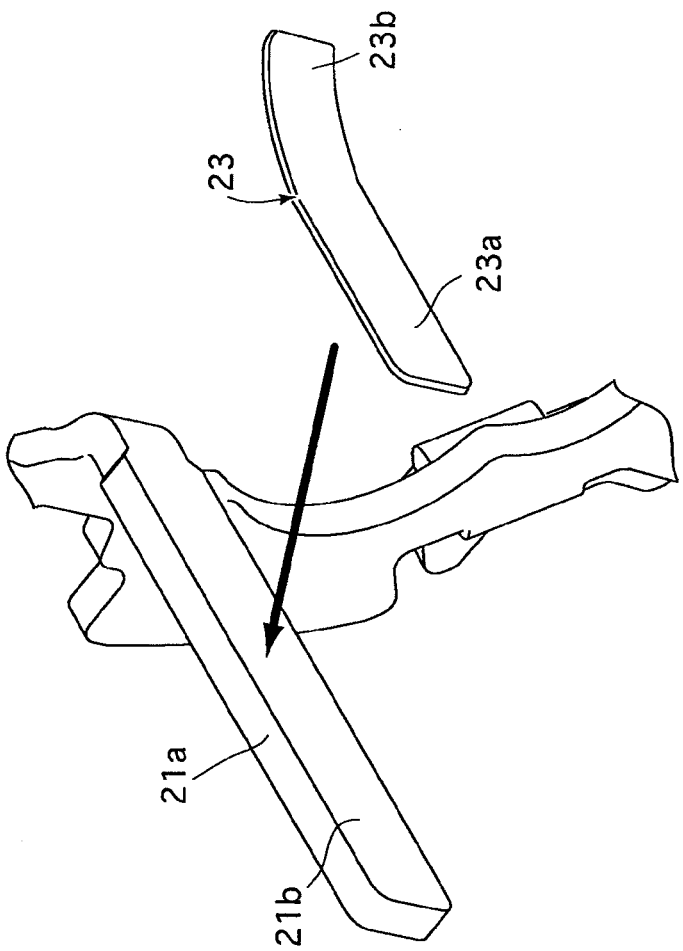

LIGHT SHIELDING STRUCTURE IN OPTICAL APPARATUS

BACKGROUND OF THE INVENTION

1. Field of the Invention

The present invention relates to a light shielding structure of an optical apparatus.

2. Description of the Related Art

In an optical apparatus such as a camera, various kinds of light shielding structures have been proposed in order to shield harmful reflected light within an optical path. For example, a light shielding structure in which matte black coating (antireflection coating) is applied, or flock paper is pasted on a reflecting portion has been proposed. Furthermore, Japanese Laid-Open Patent Application Publication No. H11-305098 has disclosed a structure in which a light-shielding member (flare cutter) protruding in the direction orthogonal to the optical axis is provided.

However, there is a case in which it is difficult to provide the above-described light shielding structure due to structural reasons, or difficult to produce a satisfactory light shielding effect. One example is shown in FIGS. 1 and 2, in which first and second relatively-movable members 11 and 12 are relatively moved in an optical axis direction (with respect to each other) to change an overlapped area therebetween. FIG. 1 shows an operational state of the optical apparatus, and FIG. 2 shows a non-operational state of the apparatus. In FIGS. 1 and 2, OA denotes an optical axis of an optical system, and CF denotes an image surface.

In the non-operational state shown in FIG. 2 of the optical apparatus, the first relatively-movable member 11 and the second relatively-movable member 12 overlap each other by almost the entire areas thereof. Whereas, in the operational state shown in FIG. 1 of the optical apparatus, the first relatively-movable member 11 and the second relatively-movable member 12 are relatively moved to cause a positional relationship such that the mutually overlapped area therebetween is reduced. For example, a lens barrel of a compact camera is a well known optical apparatus which is provided with relatively-movable members having mutually overlapping areas as described above according to whether the apparatus is in an operational state or a non-operational state. Moreover, in the operational state shown in FIG. 1, a part of the inner surface 11a on the optical axis side of the first relatively-movable member 11 is exposed to the optical path (the optical axis OA), and reflected light by the inner surface 11a on the optical axis side enters an image surface CF as shown by an arrowhead in FIG. 1, causing an adverse effect.

In order to control internal reflection by the first relatively-movable member 11, it is conceivable to, for example, apply antireflection coating onto the inner surface 11a on the optical axis side, or paste flock paper on the inner surface 11a on the optical axis side. However, when the distance between the first relatively-movable member 11 and the second relatively-movable member 12 is small, there is a possibility that interference occurs between the antireflection coating or the flock paper provided on the inner surface 11a on the optical axis side and the second relatively-movable member 12. When the distance between the first relatively-movable member 11 and the second relatively-movable member 12 is several scores of micrometers because, for example, the flock paper has a thickness of about 100 through 200 micrometers, even if the paper is thin, there is a possibility that a load is applied by repetitive relative movement between the first relatively-movable member 11 and the second relatively-movable member 12, so that the paper is peeled off or a resistance is caused due to this relative movement. Moreover, control of a film thickness of an antireflection coating is difficult, especially, in the case of a brush coating. Accordingly, such a coating is not appropriate for a light shielding structure for use when the distance between the first relatively-movable member 11 and the second relatively-movable member 12 is small. Furthermore, when light rays enter at a large incident angle in such a way that almost perfect reflection from the inner surface 11a on the optical axis side occurs, there is a possibility that a satisfactory light shielding effect may not obtained, even if the antireflection coating is applied.

Although another method for controlling the internal reflection is possible, wherein a ring-like light shielding member is provided at the rear end portion of the first relatively-movable member 11, this undesirably causes the whole structure to increase in size and become more complex. Moreover, in some cases, it is not appropriate to provide the light shielding member at the rear end position of the first relatively-movable member 11, because a normal light which correctly travels along the optical path and an internal reflection light overlap each other to cause a state in which it is difficult to shield only the internal reflection light. Furthermore, when the rear end portion of the first relatively-movable member 11 is a sliding portion, it is difficult to provide the light shielding member at this rear end portion.

SUMMARY OF THE INVENTION

The present invention provides a light shielding structure in an optical apparatus, wherein the structure is a compact structure, and is superior in a shielding performance.

According to an aspect of the present invention, a light shielding structure of an optical apparatus is provided, including first and second relatively-movable members, each having an engaging portion, the engaging portions being engaged with each other and relatively movable to each other so as to change an amount of mutually overlapping area therebetween; and a light shielding member which is provided between the engaging portions of the first and second relatively-movable members. The light shielding member is elastically deformed into a light shielding shape in which the light shielding member inwardly bends toward an optical axis of the optical apparatus to protrude from the engaging portions due to the mutually overlapping area between the engaging portions decreasing, and the light shielding member is elastically deformed into a retracted shape in which the light shielding member is housed between opposing surfaces of the engaging portions due to the mutually overlapping area between the engaging portions increasing, in accordance with a relative movement between the engaging portions.

It is desirable for the engaging portions of the first and second relatively-movable members to include an inner engaging portion and an outer engaging portion, the outer engaging portion provided on the outer diameter side more distant from the optical axis than the inner engaging portion. The light shielding member includes a fixed portion attached to the outer engaging portion at an inner surface thereof which is opposed to the inner engaging portion; and an elastically-deformable light shielding portion which is configured to protrude from the fixed portion inwardly toward the optical axis in a free state, and to be elastically deformable from the free state toward the outer engaging portion.

When the mutually overlapping area between the engaging portions of the first and second relatively-movable members is increased, it is desirable for the elastically-deformable light shielding portion to press against the inner engaging portion, and to be elastically deformed in a direction toward the outer engaging portion.

It is desirable for the elastically-deformable light shielding portion to be curved in a shape of an arc.

It is desirable for the elastically-deformable light shielding portion to protrude straightly from the fixed portion.

It is desirable for the first and the second relatively-movable members to be relatively movable to each other in a direction parallel to the optical axis, and for the elastically-deformable light shielding portion of the light shielding member to be inclined so as to gradually protrude from the outer engaging portion inwardly toward the optical axis rearwardly in the optical axis direction.

In an embodiment, a light shielding structure of an optical apparatus is provided, including a first and a second relatively-movable members, each having an engaging portion, the engaging portions being engaged with each other and relatively movable to each other to as to change an amount of mutually overlapping area therebetween; and a light shielding member which is provided between the engaging portions of the first and second relatively-movable members. The light shielding member is elastically deformed into a retracted state in which the light shielding member is elongated in the relatively moving direction of the first and second relatively-movable members so as to be housed between opposing surfaces of the engaging portions, and the light shielding member is elastically deformed into a light shielding state in which a part of the light shielding member protrudes inwardly toward the optical axis to shield unwanted light rays which are reflected by an inner-surface of the engaging portions toward the image surface.

According to the present invention, a light shielding structure which is compact, and is superior in a shielding performance can be obtained.

The present disclosure relates to subject matter contained in Japanese Patent Application No. 2006-138154 (filed on May 17, 2006), which is expressly incorporated herein by reference in its entirety.

BRIEF DESCRIPTION OF THE DRAWINGS

FIG. 5 is an enlarged perspective view of the light shielding piece and the guide key in an disassembled state shown in FIG. 3;

FIG. 6 is a enlarged perspective view of the light shielding piece and the guide key in an attached state shown in FIG. 4;

DESCRIPTION OF THE PREFERRED EMBODIMENTS

Figure 1:
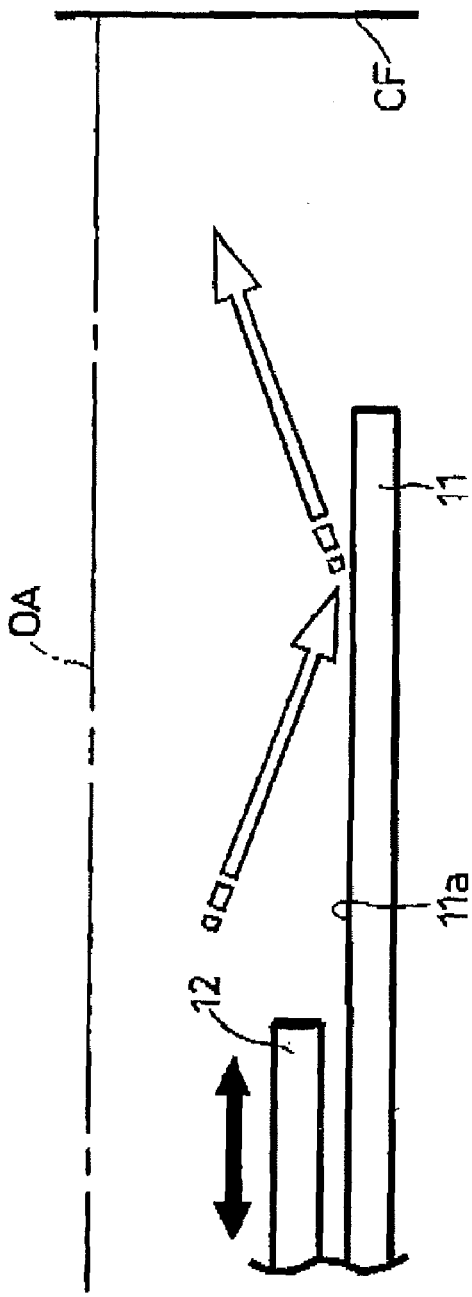
FIG. 1 is a sectional view showing a prior art example of an internal reflection occurring in an optical apparatus having relatively-movable members.
Figure 2:
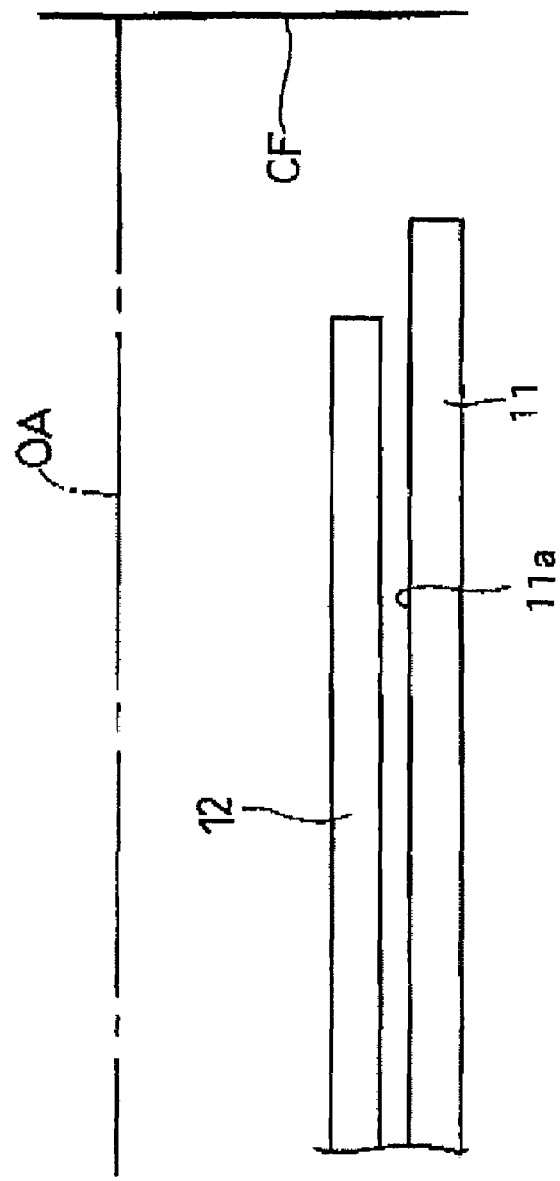
FIG. 2 is a sectional view showing a state in which the overlapped area between a first and a second relatively-movable members is large in the optical apparatus shown in FIG. 1.
Figure 3:
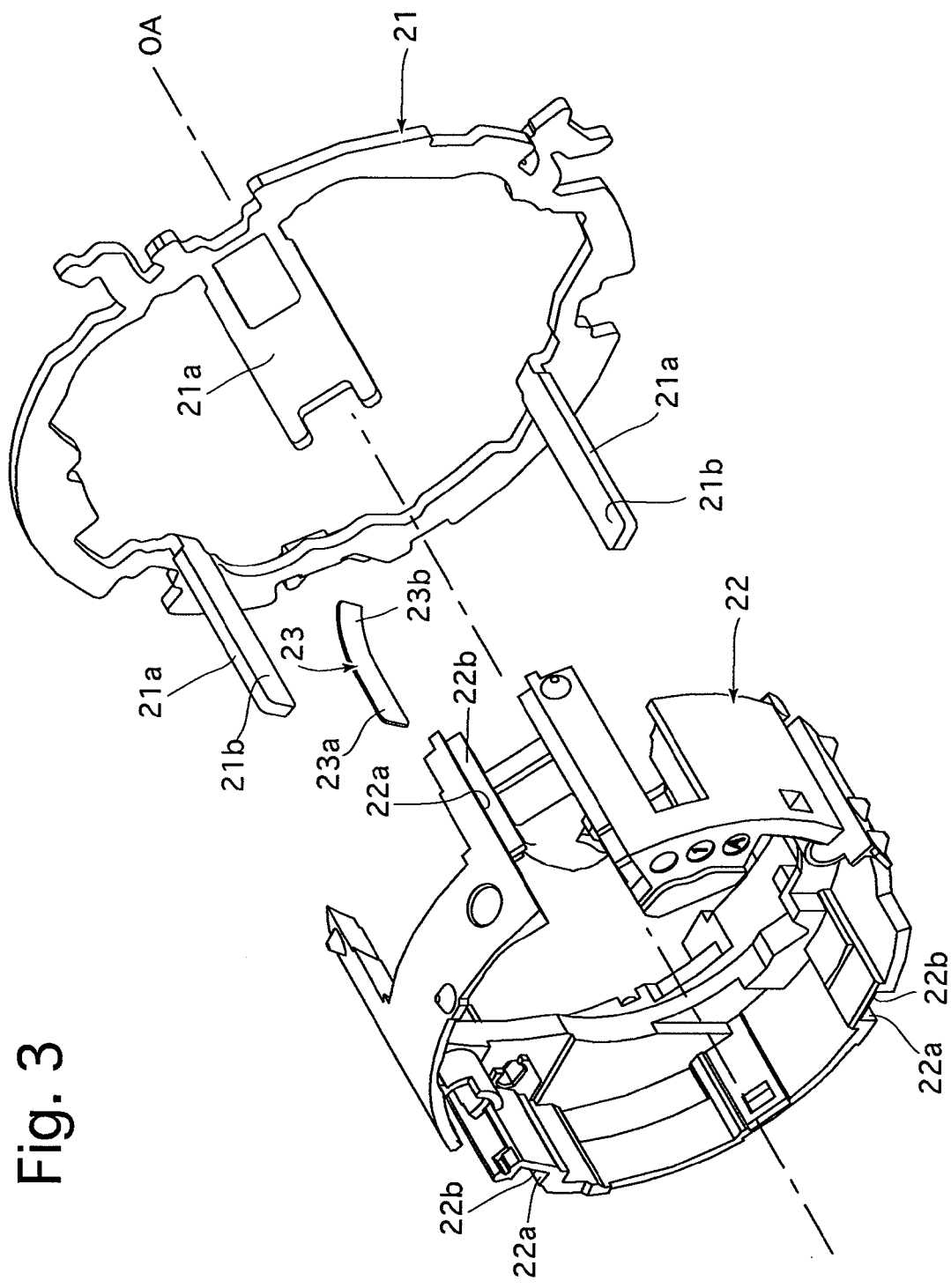
FIG. 3 is a perspective view of an disassembled state of a linear movement guide member, a lens holding member and a light shielding piece in a lens barrel to which a light shielding structure according to the present invention is applied.
Figure 4:
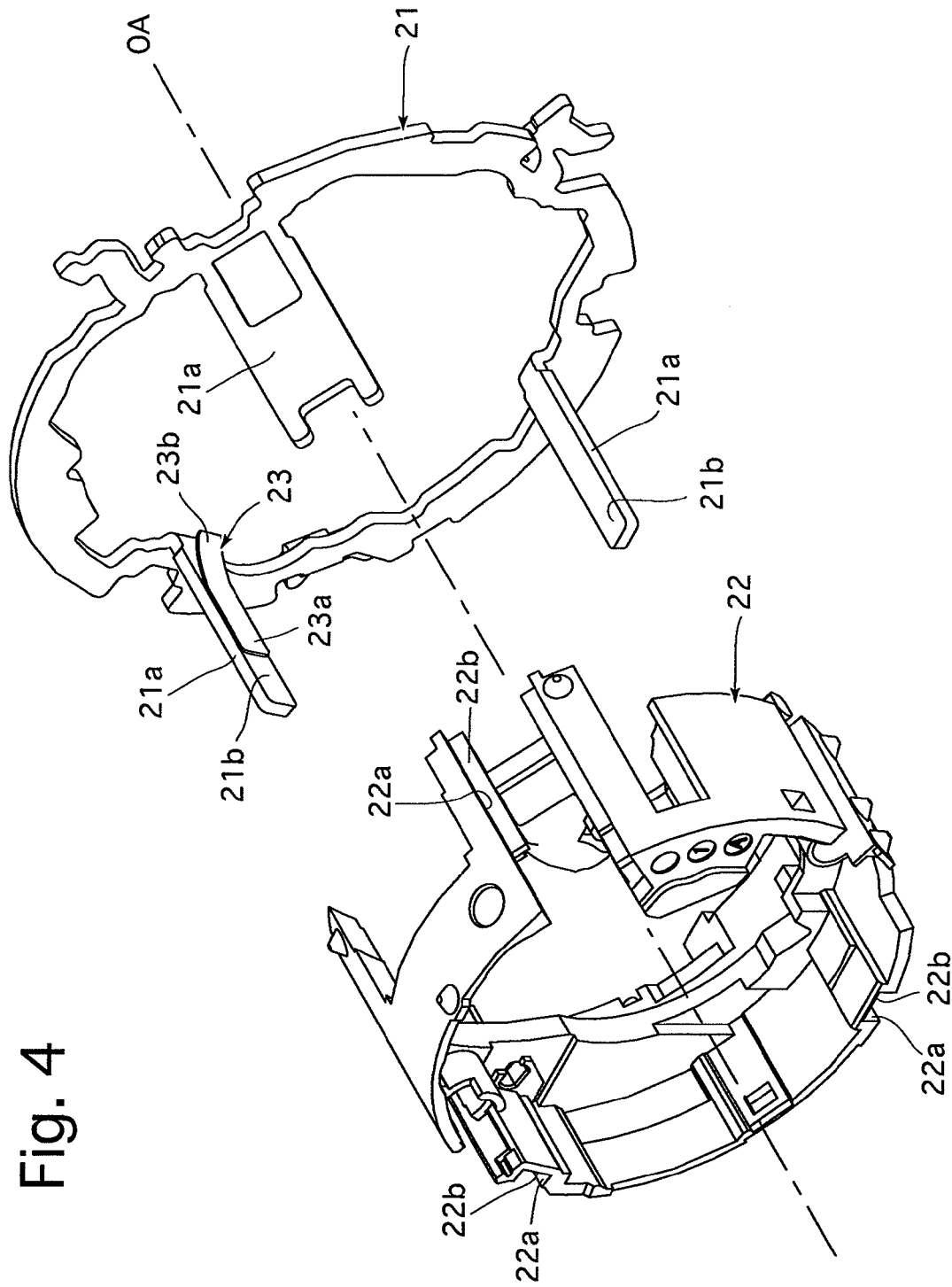
FIG. 4 is a perspective view showing a state in which the light shielding piece is attached to the guide key of the linear movement guide member in an disassembled state shown in FIG. 3.

A linear movement guide member (relatively-movable member) 21 and a lens holding member (relatively-movable member) 22, which are shown in FIGS. 3 and 4, are members of a lens barrel of a compact camera. The linear movement guide member 21 is supported so as not to rotate with respect to the main body of the camera, and the lens holding member 22 holds a part of a plurality of lens groups constituting a photographing optical system (not shown). Three guide grooves (inner engaging portions) 22a, which are approximately parallel to the optical axis OA of the photographing optical system, are formed on the outer circumferential surface of the lens holding member 22. In the linear movement guide member 21, three guide keys (outer engaging portions) 21a are provided, and protrude forward from a ring-like portion surrounding the optical axis OA, so that each of the guide keys 21a is inserted into the guide grooves 22a, respectively. The guide keys 21a and the guide grooves 22a engage with each other in such a way that relative movement of the guide key 21a and the guide groove 22a is allowed in a linear direction parallel to the optical axis OA, and the relative rotation of the lens holding member 22 and the linear movement guide member 21 is restricted. In other words, the linear movement guide member 21 guides the lens holding member 22 to move linearly in the direction of the optical axis OA.

A light shielding piece (light shielding member) 23 is provided on the inner surface (optical-axis-side surface) 21b of one guide key 21a of the linear movement guide member 21. As shown in FIG. 5, the light shielding piece 23 is a thin plate-like member having a rectangular shape and having approximately the same width of the guide key 21a. The light shielding piece 23 is formed as a molded product separated from the linear movement guide member 21.

Figure 7:
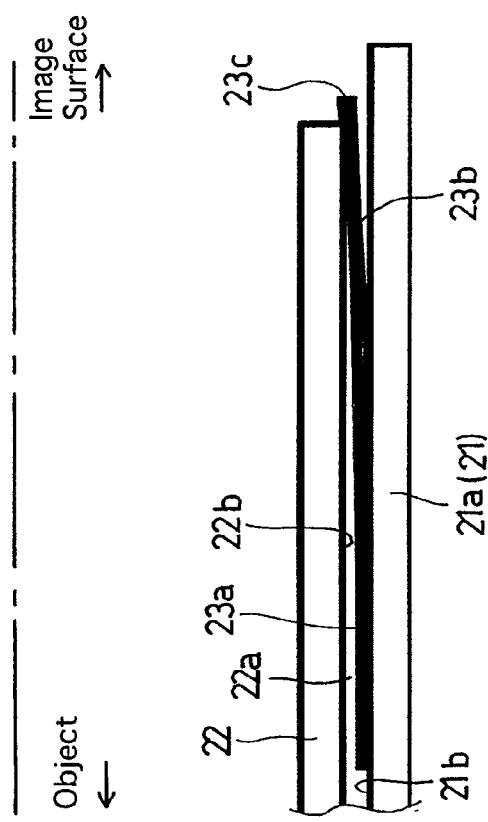
FIG. 7 is a sectional view of the linear movement guide member (guide key), the lens holding member, and the light shielding piece, illustrating the light shielding function of the light shielding piece in a photographing state of the lens barrel.
Figure 8:
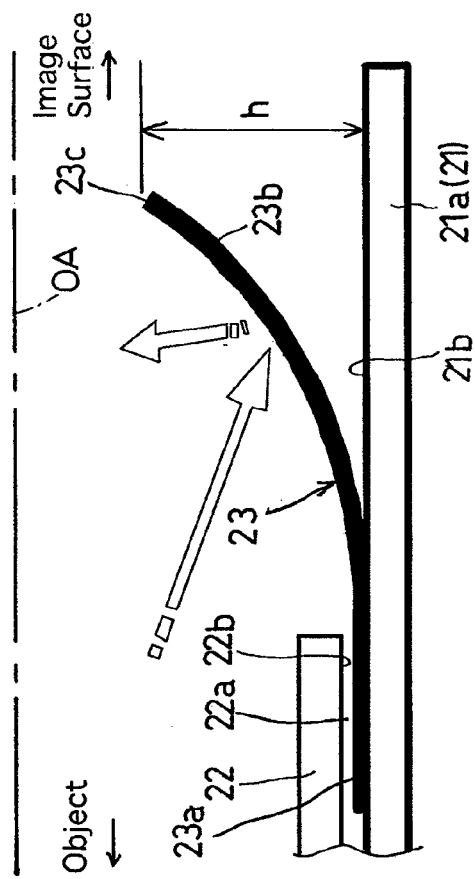
FIG. 8 is a sectional view of the linear movement guide member (guide key), the lens holding member, and the light shielding piece, illustrating an elastic deformation state of the light shielding piece in a retracted state of the lens barrel.

As shown in FIGS. 7 and 8, the plate thickness of the light shielding piece 23 is thinner than the distance between the inner surface (opposing surface) 21b of the guide key 21a and the bottom surface (opposing surface) 22b of the guide groove 22a. The light shielding piece 23 has a flat plate-like fixed portion 23a, which is approximately parallel to the inner surface 21b of the guide key 21a, and an inwardly curved portion (elastically-deformable light shielding portion) 23b which is bent along an arc over the above fixed portion 23a. The fixed portion 23a is attached to the inner surface 21b of the guide key 21a under a state in which the inwardly curved portion 23b bends (curves) rearwards in the optical axis direction as shown in FIG. 6. Appropriate methods using a double-faced tape, bonding, and the like, are used for attaching the fixed portion 23a.

In the above-described fixed state, the inwardly curved portion 23b of the light shielding piece 23 has a inwardly curved shape toward the rear in the optical axis direction, the inwardly curved portion 23b is gradually separated from the inner surface 21b of the guide key 21a (i.e., approaches the optical axis OA). The inwardly curved portion 23b is elastically deformable, and has a inwardly curved shape (light shielding shape) as shown in FIG. 7 in a free state. When the inwardly curved portion 23b is pressed in the outer radial direction as shown in FIG. 8, the inwardly curved portion 23b elastically deforms in a direction approaching the inner surface 21b so as to have an approximately flattened shape (retracted shape). A metal such as stainless steel, a copper alloy, or a synthetic resin are suitable for a material having the above-mentioned elastically deformable characteristics, however, the material of the light shielding piece 23 is not limited thereto.

Moreover, a dry lubrication grade material having low sliding resistance is used for the surface of the light shielding piece 23. Furthermore, a matte black coating is applied on the surface of the light shielding piece 23 in order to reduce reflection.

FIG. 7 is a sectional view showing a relative positional relationship between the guide key 21a and the guide groove 22a in a photographing state of the lens barrel, and FIG. 8 is a sectional view showing a relative positional relationship between the guide key 21a and the guide groove 22a in a retracted (non photographing) state of the lens barrel. When the lens barrel is moved from the photographing state to the retracted state, and vice versa, the linear movement guide member 21 and the lens holding member 22 are relatively moved in a direction parallel to the optical axis OA. In the retracted state of the lens barrel shown in FIG. 8, the mutually overlapped area between the guide key 21a and the guide groove 22a is increased, and in the photographing state shown in FIG. 7, the overlapped area therebetween is decreased.

In the photographing state shown in FIG. 7, the guide groove 22a is relatively moved forward (toward the object side) to the guide key 21a to cause the light shielding piece 23 to cover the exposed portion of the inner surface 21b of the guide key 21a. At this time, the inwardly curved portion 23b does not contact the lens holding member 22, and is maintained in a free state in which the inwardly curved portion 23b curves inwards toward the optical axis OA. In the inwardly curved state of the inwardly curved portion 23b, light traveling toward the inner surface 21b of the guide key 21a is cut (shielded/intercepted) by the inwardly curved portion 23b in such a way that this unwanted light does not travel toward the image surface side, as shown by an arrowhead in FIG. 7. In other words, the inwardly curved portion 23b functions as a light shielding wall preventing internal reflection of light rays via the guide key 21a. The inward protruding distance h (see FIG. 7) of the inwardly curved portion 23b from the inner surface 21b in the above light shielding state is determined so that light rays which correctly travel through the photographing optical path are not eclipsed. Note that, since the light shielding piece 23 is ultra thin, and the inwardly curved portion 23b extends toward rearward inward position, substantially no light rays are reflected toward the image surface from the end surface 23c of the inwardly curved portion 23b, and substantial no adverse influence on the image quality occurs.

When the lens barrel is moved from the photographing state shown in FIG. 7 to the retracted state shown in FIG. 8, the inwardly curved portion 23b presses against the bottom surface 22b of the guide groove 22a, and is elastically deformed in the radial direction toward the inner surface 21b of the guide key 21a to be housed between the inner surface 21b of the guide key 21a and the bottom surface 22b of the guide groove 22a. Although elastic stress occurs while the inwardly curved portion 23b returns to a free state thereof, a load applied to a relative movement between the guide key 21a and the guide groove 22a by the light shielding piece 23 (the inwardly curved portion 23b) can be suppressed down to an extremely small amount by, for example, forming the light shielding piece 23 so as to be ultra thin, providing excellent lubricating properties for the light shielding piece 23 (i.e., provided an extremity low sliding resistance therefor), and forming the inwardly curved portion 23b so as to have a shape which is gradually curved inward in the rearward direction.

On the other hand, when the lens barrel is moved from the retracted state shown in FIG. 8 to the photographing state shown in FIG. 7, the shape of the inwardly curved portion 23b naturally (elastically) returns to the initial inwardly curved state to achieve the above-described light shielding function because the guide groove 22a is moved forward relative to the guide key 21a in the optical axis direction to release restriction on the inwardly curved portion 23b.

According to the above-described light shielding structure of the present embodiment, the light shielding piece 23 is provided between the guide key 21a and the guide groove 22a, the inwardly curved portion 23b of the light shielding piece 23 curves (bends) inwardly toward of the optical axis OA to shield internally reflected light via the guide key 21a in the photographing state in which the overlapped area between the guide key 21a and the guide groove 22a is small, and the inwardly curved portion 23b is elastically deformed so that the inwardly curved portion 23b has an approximately flat shape so that the entire light shielding piece 23 is housed in between the guide key 21a and the guide groove 22a in the retracted state in which the overlapped area between the guide key 21a and the guide groove 22a is increased. The light shielding piece 23 can be formed thinner than flock paper, and the thickness of the light shielding piece 23 can be set more accurately in comparison with antireflection coating applied by hand, since it is difficult to control the film thickness thereof. Accordingly, the light shielding piece 23 can be easily provided in a narrow space between the guide key 21a and the guide groove 22a without causing interference with the linear movement guide member 21 and the lens holding member 22.

Moreover, the inwardly curved portion 23b in the light shielding piece 23 is elastically deformed according to the changes in the mutually overlapping area between the guide key 21a and the guide groove 22a, the inwardly curved portion 23b is housed in the space between the linear movement guide member 21 and the lens holding member 22 in the retracted state, and the inwardly curved portion 23b bends radially inwards as required, only in the photographing state which requires the light shielding function. According to this configuration, superior space efficiency can be achieved.

Moreover, since the inwardly curved portion 23b is easily deformable, a resistance applied to the relative movement between the linear movement guide member 21 and the lens holding member 22 can be suppressed down to an extremely small amount.

Furthermore, since the inwardly curved portion 23b of the light shielding piece 23 has a inwardly curved shape in the light shielding state, wherein the inwardly curved portion 23b protrudes toward the optical axis OA, unfavorable internal reflection can be reliably prevented so as to attain high light shielding performance even when light rays enter onto the inner surface 21b of the guide key 21a at a large incident angle.

Moreover, since the light shielding piece 23 is configured to be attached to the guide key 21a after being formed separately from the linear movement guide member 21, the productivity of the light shielding piece 23 is higher in comparison with that of an antireflection coating requiring processes for the applying and the drying thereof. The light shielding piece 23 itself has a simple shape which is easily molded.

Furthermore, since the inwardly curved portion 23b in the light shielding piece 23 curved in a shape of an arc, stress is not concentrated on a specific location when elastically deformed so as to advantageously reduce aged deterioration thereof.

The inward protruding distance h of the inwardly curved portion 23b of the light shielding piece 23 in a light shielding state (an inward angle with respect to the fixed portion 23a, and a length from the fixed portion 23a to the end portion 23c) may be arbitrarily configured according to required light shielding function within a range in which the light rays which correctly travel through the photographing optical path are not eclipsed.

Figure 9:
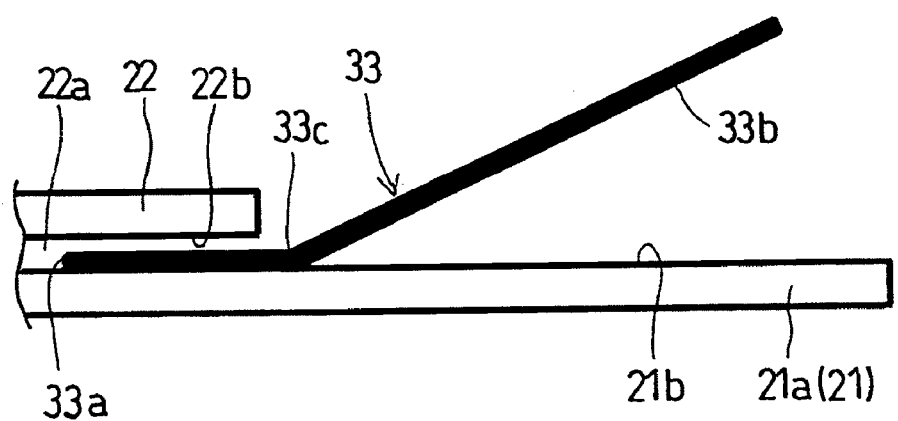
FIG. 9 is a sectional view of a linear movement guide member (guide key), a lens holding member, and a light shielding piece, illustrating another embodiment according to the present invention.

FIG. 9 shows another embodiment according to the present invention. A light shielding piece (light shielding member) 33 shown in FIG. 9 has a fixed portion 33a with a flat-plate shape attached to an inner surface 21b of a guide key 21a, and a inwardly bent portion (elastically-deformable light shielding portion) 33b which is formed to protrude straightly from the fixed portion 33a at a bending portion 33c. In other words, the inwardly bent portion 33b is formed in a straight line (flat plate) shape and is not curved, unlike the inwardly curved portion 23b of the previous embodiment. Similar to the inwardly curved portion 23b, the inwardly bent portion 33b functions as a light shielding wall preventing reflection light on the inner surface 21b of the guide key 21a from reaching the image surface in a photographing state (FIG. 9). Though not shown, in the retracted state, the inwardly bent portion 33b presses against the bottom surface 22b of a guide groove 22a, and is elastically deformed in the direction approaching the inner surface 21b to cause a state in which the inwardly bent portion 33b is housed between a linear movement guide member 21 (the inner surface 21b) and a lens holding member 22 (the bottom surface 22b) in a similar manner to that of the inwardly curved portion 23b shown in FIG. 8.

Although the light shielding structure according to the present invention has been described by referring to the embodiments shown in the drawings, however, the present invention is not limited thereto. Though the embodiment has been applied to a structure for preventing internal reflection in the members forming the lens barrel, a light shielding structure according to the present invention may be also applied to, for example, an optical apparatus other than a lens-barrel.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A light shielding structure of an optical apparatus comprising:
    first and second relatively-movable members, each having an engaging portion, said engaging portions being engaged with each other and relatively movable to each other so as to change an amount of mutually overlapping area therebetween; and
    a light shielding member which is provided between said engaging portions of said first and second relatively-movable members,
    wherein said light shielding member is configured to return to a free state in which said light shielding member bends inwardly towards an optical axis of said optical apparatus to protrude from said engaging portions when said mutually overlapping area between said engaging portions decreases, and said light shielding member is elastically deformed into a retracted shape in which a portion of said light shielding member which bends inwardly towards the optical axis is housed between opposing longitudinally extending surfaces of said engaging portions when said mutually overlapping area between said engaging portions increases, in accordance with a relative movement between said engaging portions.

2. The light shielding structure of an optical apparatus according to claim 1, wherein said engaging portions of said first and second relatively-movable members comprise an inner engaging portion and an outer engaging portion, said outer engaging portion provided on the outer diameter side more distant from the optical axis than said inner engaging portion, and
    wherein said light shielding member comprises:
        a fixed portion attached to said outer engaging portion at an inner surface thereof which is opposed to said inner engaging portion; and
        an elastically-deformable light shielding portion which is configured to protrude from said fixed portion inwardly toward the optical axis in the free state, and to be elastically deformable from said free state toward said outer engaging portion.

3. The light shielding structure of an optical apparatus according to claim 2, wherein
    when said mutually overlapping area between said engaging portions of said first and second relatively-movable members is increased, said elastically-deformable light shielding portion presses against said inner engaging portion, and is elastically deformed in a direction toward said outer engaging portion.

4. The light shielding structure of an optical apparatus according to claim 2, wherein said elastically-deformable light shielding portion is curved in a shape of an arc.

5. The light shielding structure of an optical apparatus according to claim 2, wherein said elastically-deformable light shielding portion protrudes straightly from said fixed portion.

6. The light shielding structure of an optical apparatus according to claim 2, wherein said first and the second relatively-movable members are relatively movable, to each other in a direction parallel to the optical axis, and
    wherein said elastically-deformable light shielding portion of said light shielding member is inclined so as to gradually protrude from said outer engaging portion inwardly toward the optical axis rearwardly in said optical axis direction.

7. The light shielding structure according to claim 1, wherein said opposing longitudinally extending surfaces of said engaging portions, in which said portion of said light shielding member which bends inwardly towards the optical axis is housed, define a space positioned radially outward of one of said first and second relatively-movable members and radially inward of the other of said first and second relatively-movable members.

8. A light shielding structure of an optical apparatus, comprising:
    a first and a second relatively-movable members, each having an engaging portion, said engaging portions being engaged with each other and relatively movable to each other so as to change an amount of mutually overlapping area therebetween; and
    a light shielding member which is provided between said engaging portions of said first and second relatively-movable members;
    wherein said light shielding member is elastically deformed into a retracted state in which said light shielding member is elongated in the relatively moving direction of said first and second relatively-movable members so as to be housed between opposing longitudinally extending surfaces of said engaging portions, and said light shielding member is configured to return to a free state in which a part of said light shielding member protrudes inwardly toward the optical axis to shield unwanted light rays which are reflected by an inner-surface of said engaging portions toward the image surface.

9. The light shielding structure of an optical apparatus according to claim 8, wherein said engaging portions of said first and second relatively-movable members comprise an inner engaging portion and an outer engaging portion, said outer engaging portion provided on the outer diameter side more distant from the optical axis than said inner engaging portion, and
  wherein said light shielding member comprises:
    a fixed portion attached to said outer engaging portion at an inner surface thereof which is opposed to said inner engaging portion; and
    an elastically-deformable light shielding portion which is configured to protrude from said fixed portion inwardly toward the optical axis in the free state, and to be elastically deformable from said free state toward said outer engaging portion.

10. The light shielding structure of an optical apparatus according to claim 9, wherein
  when said mutually overlapping area between said engaging portions of said first and second relatively-movable members is increased, said elastically-deformable light shielding portion presses against said inner engaging portion, and is elastically deformed in a direction toward said outer engaging portion.

11. The light shielding structure of an optical apparatus according to claim 9, wherein said elastically-deformable light shielding portion is curved in a shape of an arc.

12. The light shielding structure of an optical apparatus according to claim 9, wherein said elastically-deformable light shielding portion protrudes straightly from said fixed portion.

13. The light shielding structure of an optical apparatus according to claim 9, wherein said first and the second relatively-movable members are relatively movable to each other in a direction parallel to the optical axis, and
  wherein said elastically-deformable light shielding portion of said light shielding member is inclined so as to gradually protrude from said outer engaging portion inwardly toward the optical axis rearwardly in said optical axis direction.

14. The light shielding structure according to claim 8, wherein said opposing longitudinally extending surfaces of said engaging portions, in which said light shielding member is elongated in the relatively moving direction of said first and second relatively-movable members so as to be housed between said opposing longitudinally extending surfaces of said engaging portions, define a space positioned radially outward of one of said first and second relatively-movable members and radially inward of the other of said first and second relatively-movable members.

* * * * *